(12) United States Patent
O'Lenick

(10) Patent No.: US 12,010,991 B1
(45) Date of Patent: Jun. 18, 2024

(54) MICROEMULSION WITH DISINFECTANT PROPERTIES

(71) Applicant: Thomas O'Lenick, Monroe, GA (US)

(72) Inventor: Thomas O'Lenick, Monroe, GA (US)

( * ) Notice: Subject to any disclaimer, the term of this patent is extended or adjusted under 35 U.S.C. 154(b) by 542 days.

(21) Appl. No.: 17/203,108

(22) Filed: Mar. 16, 2021

(51) Int. Cl.
*A01N 25/04* (2006.01)
*A01N 31/08* (2006.01)

(52) U.S. Cl.
CPC .............. *A01N 25/04* (2013.01); *A01N 31/08* (2013.01)

(58) Field of Classification Search
CPC ................................. C11D 11/00; A01N 25/04
See application file for complete search history.

(56) References Cited

U.S. PATENT DOCUMENTS

| 5,403,587 | A | 4/1995 | McCue et al. |
| 8,691,292 | B2 | 4/2014 | Daigle et al. |
| 9,451,763 | B2 | 9/2016 | Daigle et al. |
| 9,565,858 | B2 | 2/2017 | Ijaz et al. |
| 9,609,864 | B2 | 4/2017 | Daigle et al. |
| 9,750,245 | B2 | 9/2017 | Lemire et al. |
| 10,111,425 | B2 | 10/2018 | Daigle et al. |
| 10,285,954 | B2 | 5/2019 | Lemire et al. |
| 10,405,544 | B2 | 9/2019 | Eagle et al. |
| 2020/0229434 | A1 * | 7/2020 | Daigle .................. A01N 25/30 |

FOREIGN PATENT DOCUMENTS

WO    WO2022034606 A1 *  2/2022  ............. C11D 11/00

* cited by examiner

*Primary Examiner* — Paul V Ward

(57) ABSTRACT

An aqueous microemulsion containing at least one phenolic compound, specifically thymol and/or carvacerol, a solubilizer and water. This microemulsion can be applied to surfaces to provide disinfectant properties.

7 Claims, No Drawings

MICROEMULSION WITH DISINFECTANT PROPERTIES

RELATED APPLICATIONS

The present application claims the benefit of U.S. Provisional Application No. 63/071,612 filed on Aug. 28, 2020, the entire contents of which are incorporated by reference.

OVERNMENT SPONSORSHIP

None

FIELD OF THE INVENTION

The present invention broadly relates to disinfectant formulations comprising one or more phenolic compounds. More specifically, but not exclusively, the present invention relates to an odorless, surfactant free disinfectant formulation capable of disinfecting large surfaces.

BACKGROUND OF THE INVENTION

In spite of modern improvements in hygiene and infection prevention, viruses are capable of spreading to the public and causing global pandemics. This has been due in part to the fact that infections caused by viruses and fungi have increased as a result of travel and global interconnections and the lack of a disinfectant formulation that can be applied to a large area without negatively affecting humans.

A great many of the current antimicrobial compositions, including sanitizers and disinfectants, contain antimicrobial agents which are not naturally occurring and can be irritating to humans. Typical antimicrobial agents used in sanitizers and disinfectants include chemical disinfectants such as phenolic compounds, quaternary ammonium compounds, formaldehyde and halogen containing compounds. A great many of these disinfectants cause undesirable effects on both the environment and on human health. The need for a disinfectant that can be used to sanitize large areas, like the inside of a commercial airplane, in a quick, non-irritating environmentally friendly way have become of paramount importance. Along with the effectiveness of the disinfectant, the formulation cannot contain a pungent odor. If the formulation were to contain a strong odor, it should not be used indoors, let along inside a pressurized airplane cabin.

While some natural plant oils have been known since antiquity to have curative properties, the topical and oral benefits of natural plant oils have more recently been attributed to anti-microbial properties. A great many of the natural essential oils derived from cajeput, cedarwood, citronella, clove, cypress, fir needle, *eucalyptus*, garlic, lavender, lemon, lemongrass, marjoram, niaouli, onion, orange, oregano, patchouli, peppermint, rosemary, rosewood, tea tree, ylang and vetiver are known. Of these natural essential oils, oregano oil, comprising a complex mixture of antimicrobial compounds, has been used as a reference for the comparison of the bactericidal action of other substances owing to its near ideal antibacterial properties. Oregano oil has been demonstrated as exerting a high degree of antifungal, anti-parasitic, antiviral and anti-bacterial action. The phenolic flavonoids carvacrol and thymol are two potent natural antiseptic agents encountered primarily in oregano oil.

Thymol (also known as 2-isopropyl-5-methylphenol, IPMP) is a natural monoterpenoid phenol derivative of p-Cymene. $C_{10}H_{14}O$, isomeric with carvacrol, found in oil of thyme, and extracted from *Thymus vulgaris* (common thyme. Thymol also provides the distinctive, strong flavor of the culinary herb thyme, also produced from *T. vulgaris*.

Attempts have been made to formulate disinfectant solutions based upon essential oils. However, because of their hydrophobic nature, essential oils are not readily soluble or miscible in water at a concentration high enough to make then viable as an antiseptic. As a result, essential oils are often difficult to prepare in a form that will allow them to be readily incorporated into an aqueous solution. Addition of surfactants like sodium lauryl sulfate result in better solubility, but because of the presence of this type of detergent, essential oils are simply removed from the surface.

U.S. Pat. No. 5,403,587 issued to McCue et al. on Apr. 4, 1995 discloses an antimicrobial composition that uses both a solvent and a surfactant to facilitate the formation of a homogeneous aqueous mixture of an essential oil. However, this composition is not suitable for disinfecting large surfaces such as commonly encountered in agricultural settings where the disinfectant solution is commonly prepared from a concentrate using the on-site water source.

U.S. Pat. No. 8,691,292 issued to Daigle et al. on Apr. 8, 2014 discloses a disinfectant formulation comprising one or more phenolic compounds of natural origin. While this disinfectant is capable of disinfecting large surfaces, it required several strong surfactants including sodium lauryl sulfate. The surfactants create macrostructures in aqueous solution, while these surfactants can create a clear solution, they cannot remove the odor from the essential oils and can form cloudy/less stable formulations with slight adjustments in pH, salt or addition of excess water.

Solubilizes are much different than surfactant molecules. Dr. Ricardo Diez, a professor at Rutgers University, teaches "Solubilizers are a group of surfactants that are completely water soluble but have a little bit of oil solubility. They are, as their name reveals used to solubilize an oil in water or another hydrophilic medium (such as a herbal infusion or a hydrosol). The solubilized molecule has such a tiny particle size that the solution appears either completely transparent or lightly translucent."

Microemulsion are typically preferred in drug solubilization and delivery. There are many benefits of microemulsions over the traditional emulsion. The first is the product stability. Emulsions are kinetically stable and therefore: inherently unstable. Minor changes in pH, salt concentration, heat or time can cause the emulsion to break. Microemulsions on the other hand, are clear, thermodynamically stable isotropic mixtures of oil, water, and a solubilizer.

Surprisingly and unexpectedly, when a microemulsion is prepared in a manner consistent with the current invention, the resulting formulation is essentially odorless, easily applied, substrate substantive products that can be prepared at concentrations that are high enough to be effective antimicrobial agents on environmental surfaces. In addition, these microemulsions, if properly formulated, are effective against COVID 19.

SUMMARY OF THE INVENTION

The present invention relates to microemulsion with disinfectant properties consisting of one disinfectant oil with a phenolic compounds or neem oil, water and a solubilizer or mixture of solubilizers.

Solubilizers are similar to emulsifiers in that they have both hydrophilic and lipophilic traits, but solubilizers tend to be completely water soluble and only a little oil soluble. In practice this means they can suspend smaller amounts of oils (think essential oils in perfume or room sprays), and because they are solubilizing only small amounts of oil the entire solution can still appear clear or lightly hazy. One uses solubilizers when adding just small amounts of oil to a water-based product.

As broadly claimed, the present invention relates to a microemulsion suitable for disinfecting and cleaning large surfaces.

DETAILED DESCRIPTION OF THE INVENTION

In an embodiment, the present invention relates to an microemulsion disinfectant formulation consisting of:
1. A disinfectant microemulsion formulation consisting of:
   a. from about 0.20 to about 1.0% weight of at least one antimicrobial selected from the groups consisting of:
      i. thymol
      ii. carvacrol
   and mixtures thereof,
   b. from about 1.00 to about 20.00% weight of polyethylene glycol sorbitan monooleate;
   c. from about 2.00 to about 20.00% weight of polyethylene glycol sorbitan monolaurate; and
   d. from about 59.00 to about 96.95% water.

Preferred Embodiments

In a preferred embodiment the disinfectant microemulsion formulation consists of:
a. the antimicrobial is used is at the level of 0.23% weight;
b. wherein polyethylene glycol sorbitan monoleate is 2.50% by weight;
c. the polyethylene glycol sorbitan monooleate is 2.50% by weight;
d. sufficient water to make 100% by weight.

In a preferred embodiment the disinfectant microemulsion formulation consists of:
a. the antimicrobial is used is at the level of 0.23% by weight;
b. wherein polyethylene glycol sorbitan monoleate is 3.00% by weight;
c. the polyethylene glycol sorbitan monooleate is 2.00% by weight;
d. sufficient water to make 100% by weight.

In a preferred embodiment the disinfectant microemulsion formulation consists of:
a. the antimicrobial is used is at the level of 0.23% by weight;
b. wherein polyethylene glycol sorbitan monoleate is 1.00% by weight;
c. the polyethylene glycol sorbitan monooleate is 4.00% by weight;
d. sufficient water to make 100% by weight.

In a preferred embodiment the disinfectant microemulsion formulation consists of:
a. the antimicrobial is used is at the level of 0.05% by weight;
b. wherein polyethylene glycol sorbitan monoleate is 2.50% by weight;
c. the polyethylene glycol sorbitan monooleate is 2.50% by weight;
d. sufficient water to make 100% by weight.

In a preferred embodiment the disinfectant microemulsion formulation consists of:
a. the antimicrobial is used is at the level of 0.05% by weight;
b. wherein polyethylene glycol sorbitan monoleate is 1.00% by weight;
c. the polyethylene glycol sorbitan monooleate is 4.00% by weight;
d. sufficient water to make 100% by weight.

In a preferred embodiment the disinfectant microemulsion formulation consists of:
a. the antimicrobial is used is at the level of 0.05% weight;
b. wherein polyethylene glycol sorbitan monoleate is 3.00% by weight;
c. the polyethylene glycol sorbitan monooleate is 2.00% weight;
d. sufficient water to make 100% weight.

In a preferred embodiment the process for preparing the disinfectant microemulsion formulation consisting of:
2. A process for preparing a the disinfectant microemulsion of claim 1 which comprises:
   a. dissolving the antimicrobial in polyethylene glycol sorbitan monoleate and polyethylene glycol sorbitan monlaurate;
   b. slowly adding sufficient water to make 100% by weight solution.

Raw Materials

Example 1. Thymol is commercially available from a variety of sources including Carolina Chemical of Charlotte, North Carolina. It has the following structure:

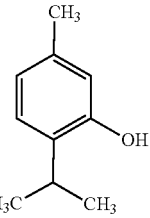

CAS Number: 89-83-8

Example 2. Carvacerol is commercially available from a variety of sources including Sigma-Aldrich of St. Louis, Missouri. It has the following structure:

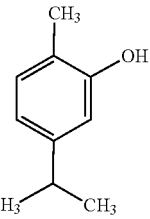

CAS Number: 499-75-2

Example 3. Polyethylene glycol sorbitan monolaurate is commercially available from a variety of sources including Sigma-Aldrich of St. Louis, Missouri. It has the chemical structure of:

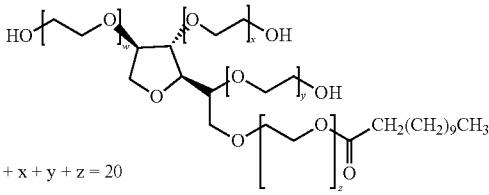

wherein;
sum of $w + x + y + z = 20$

CAS Number: 9005-64-5

Example 4. Polyethylene glycol sorbitan monooleate is commercially available from a variety of sources including Sigma-Aldrich of St. Louis, Missouri. It has the chemical structure of:

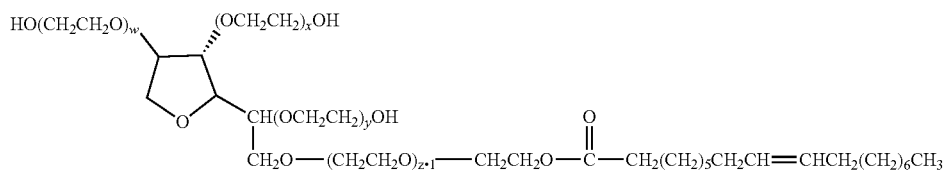

wherein;
sum of w + x + y + z = 20

CAS Number: 9005-65-6

Microemulsion Disinfectant Formulation

The microemulsion disinfectant formulation was prepared by: adding polyethylene glycol sorbitan monooleate (Example 4) and Polyethylene glycol sorbitan monolaurate (Example 3) into a mixing tank. Add thymol (Example 1) and/or carvcerol (Example 2) into the mixing tank and allow to stir until homogenous. Slowly add water to the mixture and allow to stir until homogenous.

| Example | Active Example | Grams | Polyethylene glycol sorbitan monooleate Grams | Polyethylene glycol sorbitan monolaurate Grams | Water Grams |
|---|---|---|---|---|---|
| 5 | 1 | 0.23 | 2.50 | 2.50 | 94.75 |
| 6 | 2 | 0.23 | 2.50 | 2.50 | 94.75 |
| 7 | 1 | 0.05 | 1.00 | 2.00 | 96.95 |
| 8 | 2 | 0.05 | 1.00 | 2.00 | 96.95 |
| 9 | 1 | 1.00 | 20.00 | 20.00 | 59.00 |
| 10 | 2 | 1.00 | 20.00 | 20.00 | 59.00 |
| 11 | 1 | 0.25 | 2.50 | 2.50 | 94.75 |
| 12 | 2 | 0.25 | 2.50 | 2.50 | 94.75 |
| 13 | 1 | 0.75 | 5.00 | 5.00 | 89.25 |
| 14 | 2 | 0.75 | 5.00 | 5.00 | 89.25 |
| 15 | 1 | 0.21 | 2.50 | 2.50 | 94.79 |

Applications
Microemulsions of the Present Invention

Thymol has antiseptic properties but is only slightly soluble in water (Solubility in water: 0.9 g/L or 0.09% wt/wt at 20° C.). This limits the application of a solution of thymol as an antiseptic to 0.09% by weight. Unfortunately, the thymol must be soluble in water at a concentration of at least 0.20% by weight for this current application. This is 2.2 times the concentration achievable in simple solutions so a solubilizer must be added.

Formulations not of the Present Invention

| Active Example | Solvent | Surfactant/ Solubilizer | $H_2O$ |
|---|---|---|---|
| 1 | Propanediol | SugaNate 160 | Not Clear |
| 2 | Propanediol | SugaNate 160 | Not Clear |
| 1 | Propanediol | Polyglycerol | Not Clear |
| 2 | Propanediol | Polyglycerol | Not Clear |
| 1 | Propanediol | Polyglycerol D9 | Not Clear |
| 2 | Propanediol | Polyglycerol D9 | Not Clear |
| 1 | Propanediol | Polyglycerol D9 SugarNate | Not Clear |
| 2 | Propanediol | Polyglycerol D9 SugarNate | Not Clear |

| Active Example | Solvent | Surfactant/ Solubilizer | $H_2O$ |
|---|---|---|---|
| 1 | Propanediol | AB-1 | Not Clear |
| 2 | Propanediol | AB-1 | Not Clear |
| 1 | NONE | Quat 242 Ti-Nat | Clear |
| 2 | NONE | Quat 242 Ti-Nat | Clear |
| 1 | Propanediol | Quat 242 Ti-Nat | Not Clear |
| 2 | Propanediol | Quat 242 Ti-Nat | Not Clear |
| 1 | Propanediol | Quat 242 Ti-Nat AB-1 | Not Clear |
| 2 | Propanediol | Quat 242 Ti-Nat AB-1 | Not Clear |
| 1 | Propanediol | AB-1 | Not Clear |
| 2 | Propanediol | AB-1 | Not Clear |
| 1 | $C_{8-10}$ Acid Ethanol | Polysorbate 20 | Clear |
| 2 | $C_{8-10}$ Acid Ethanol | Polysorbate 20 | Clear |
| 1 | Ethanol | Polysorbate 20 | Cloudy |
| 2 | Ethanol | Polysorbate 20 | Cloudy |
| 1 | NONE | Polysorbate 20 Polysorbate 80 | Clear |
| 2 | NONE | Polysorbate 20 Polysorbate 80 | Clear |

Another aspect of this invention is to prepare microemulsion disinfectant formulation by the procedure described above. Failure to follow the procedure will lead a non-clear, non-homogenous mixture. Furthermore, when the procedure is followed, the resulting formulation will be a clear microemulsion that has little to no odor.

All patents cited herein are incorporated by reference. All temperatures are in ° C., all percentages are percentage weights by weight.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

The invention claimed is:

1. A disinfectant microemulsion formulation comprising:
   a. at least one antimicrobial selected from the groups consisting of:
      i. thymol
      ii. carvacrol
   and mixtures thereof,
   having a concentration ranging from about 0.20 to about 1.00% by weight;
   b. a mixture consisting of:
      i. from about 1.00 to 20.00% by weight of polyethylene glycol sorbitan monoleate;
      ii. from about 2.00 to 20.00% by weight polyethylene glycol sorbitan monolaurate;
   and
   c. water having a concentration sufficient to make a 100% by weight solution.

2. A disinfectant microemulsion formulation of claim 1 wherein:
   a. at least one antimicrobial is thymol having the concentration of about 0.05% by weight;
   b. a mixture consisting of:
      a. from about 1.00% by weight of polyethylene glycol sorbitan monoleate;
      b. from about 2.00% by weight polyethylene glycol sorbitan monolaurate;
   and
   c. water having a concentration to make the total of all ingredients 100% by weight.

3. A disinfectant microemulsion formulation of claim 1 wherein:
   a. at least one antimicrobial is carvacrol having the concentration of about 0.05% by weight;
   b. a mixture consisting of:
      c. from about 1.00% by weight of polyethylene glycol sorbitan monoleate;
      d. from about 2.00% by weight polyethylene glycol sorbitan monolaurate;
   and
   c. water having a concentration to make the total of all ingredients 100% by weight.

4. A disinfectant microemulsion formulation of claim 1 wherein:
   a. at least one antimicrobial is carvacrol having the concentration of about 0.23% by weight;
   b. a mixture consisting of:
      e. from about 2.50% by weight of polyethylene glycol sorbitan monoleate;
      f. from about 2.50% by weight polyethylene glycol sorbitan monolaurate;
   and
   c. water having a concentration to make the total of all ingredients 100% by weight.

5. A disinfectant microemulsion formulation of claim 1 wherein:
   a. at least one antimicrobial is thymol having the concentration of about 0.23% by weight;
   b. a mixture consisting of:
      g. from about 2.50% by weight of polyethylene glycol sorbitan monoleate;
      h. from about 2.50% by weight polyethylene glycol sorbitan monolaurate;
   and
   c. water having a concentration to make the total of all ingredients 100% by weight.

6. A disinfectant microemulsion formulation of claim 1 wherein:
   a. at least one antimicrobial is thymol having the concentration of about 1.00% by weight;
   b. a mixture consisting of:
      i. from about 20.00% by weight of polyethylene glycol sorbitan monoleate;
      j. from about 20.00% by weight polyethylene glycol sorbitan monolaurate;
   and
   c. water having a concentration to make the total of all ingredients 100% by weight.

7. A disinfectant microemulsion formulation of claim 1 wherein:
   a. at least one antimicrobial is carvacrol having the concentration of about 1.00% by weight;
   b. a mixture consisting of:
      k. from about 20.00% by weight of polyethylene glycol sorbitan monoleate;
      l. from about 20.00% by weight polyethylene glycol sorbitan monolaurate; and
   c. water having a concentration to make the total of all ingredients 100% by weight.

* * * * *